United States Patent [19]

Sewell

[11] Patent Number: 5,438,409

[45] Date of Patent: Aug. 1, 1995

[54] READOUT FOR A RING LASER ANGULAR RATE SENSOR

[75] Inventor: Wesley C. Sewell, Dunedin, Fla.

[73] Assignee: Honeywell Inc., Minneapolis, Minn.

[21] Appl. No.: 731,708

[22] Filed: May 8, 1985

[51] Int. Cl.[6] ............................ G01B 9/02; H01S 3/083
[52] U.S. Cl. .................................. 356/350; 372/94
[58] Field of Search ............... 356/350; 324/83 Q; 372/94

[56] References Cited

U.S. PATENT DOCUMENTS

| 3,373,650 | 3/1968 | Killpatrick . | |
|---|---|---|---|
| 3,627,425 | 12/1971 | Doyle | 356/350 |
| 4,152,072 | 5/1979 | Hutchings | 356/350 |
| 4,248,534 | 2/1981 | Elbert | 356/350 |
| 4,504,146 | 3/1985 | Morgan | 356/350 |
| 4,529,311 | 7/1985 | Morgan | 356/350 |

OTHER PUBLICATIONS

"Quadrature Decoder/Counter Interface IC", Technical Data, Oct. 1985, Hewlett Packard, HCTL-2000.

Primary Examiner—Stephen C. Buczinski
Attorney, Agent, or Firm—Robert Pajak

[57] ABSTRACT

A data signal processor processes a pair of phase quadrature signals responsive to an interference pattern indicative of the phase change between counter-propagating laser beams in a rotation sensor. The data signal processor provides an output pulse for each $\pi/2$ phase change between the counter-propagating laser beams of the sensor.

8 Claims, 3 Drawing Sheets

Fig. 2
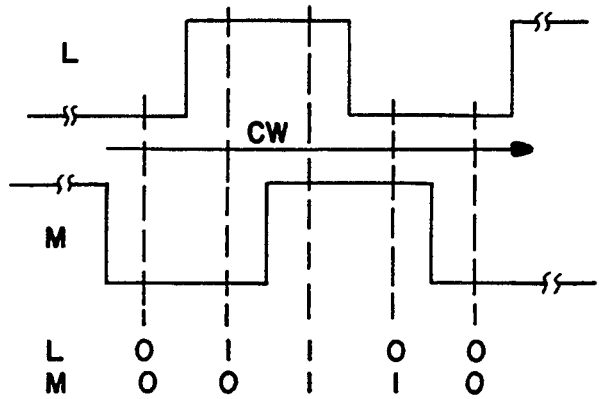
| L | 0 | 1 | 1 | 0 | 0 |
| M | 0 | 0 | 1 | 1 | 0 |
Fig. 3
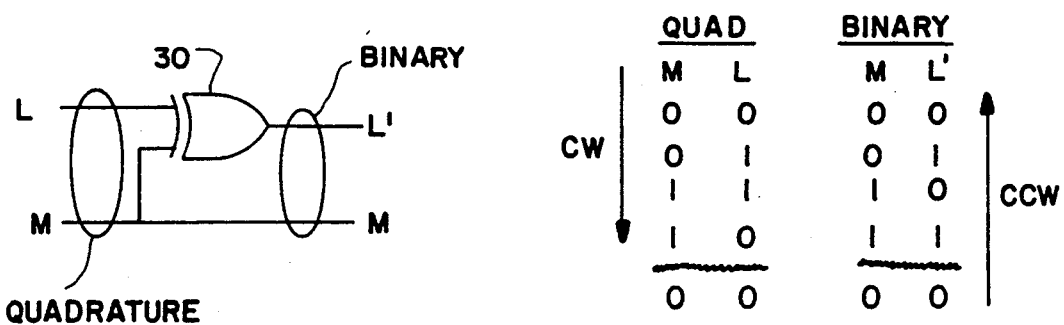
Fig. 4
| | (24-OUTPUT) OLD BINARY = B | (24-INPUT) NEW BINARY A | | A' | (42) A'>B | (44) A'<B | (46) CW LINE | (48) CCW LINE |
|---|---|---|---|---|---|---|---|---|
| | 1 1 | 0 0 | * | 1 0 | 0 | 1 | 1 | 0 |
| TIME CW | 0 0 | 0 1 | | 0 1 | 1 | 0 | 1 | 0 |
| | 0 1 | 1 0 | * | 0 0 | 0 | 1 | 1 | 0 |
| | 1 0 | 1 1 | | 1 1 | 1 | 0 | 1 | 0 |
| | 1 1 | 0 0 | * | 1 0 | 0 | 1 | 1 | 0 |
| | 0 0 | | | | | | | |
| | 0 0 | 1 1 | * | 0 1 | 1 | 0 | 0 | 1 |
| TIME CCW | 1 1 | 1 0 | | 1 0 | 0 | 1 | 0 | 1 |
| | 1 0 | 0 1 | * | 1 1 | 1 | 0 | 0 | 1 |
| | 0 1 | 0 0 | | 0 0 | 0 | 1 | 0 | 1 |
| | 0 0 | | | | | | | |

5,438,409

READOUT FOR A RING LASER ANGULAR RATE SENSOR

BACKGROUND OF THE INVENTION

This invention relates to a readout apparatus for a ring laser angular rate sensor having improved resolution.

Ring laser angular rate sensors are well known in the art. An example of a ring laser angular rate sensor is illustrated in U.S. Pat. No. 3,373,650, issued to Killpatrick and assigned to the same assignee as the present invention. In such sensors, a portion of the counter-propagating laser beams are optically hetrodyne. Briefly, this may be accomplished by way of example using a prism which combines a portion of the counter-propagating laser beams at slightly different angles and thereby creates a fringe pattern across the surface of a detector array containing one or more photodetectors such as photosensitive diodes, each diode being smaller than an individual fringe spacing. A pair of photodetectors are typically separated by one quarter of a fringe spacing so as to provide output signals which are in phase quadrature. The photodetector output signals are utilized as a mechanism for counting the number of fringe spacings passing thereby. Each fringe passing the photodetector represents a precise amount of rotation angle. The rate of change of the fringe changes being indicative of the rotation rate. Two detectors are usually employed and spaced as aforesaid to provide a pair of signals which can be utilized to determine rotation direction. An example of a photodetector array, by way of example, is illustrated in U.S. Pat. No. 4,152,072 issued to Hutchings.

When the output of a single photodetector responsive to the interference pattern is used as the primary readout, the resolution is limited to one fringe change or count which can be interpreted as a precise measurement of rotation angle. The object of the present invention is to provide a readout having four times the resolution of a single photodetector output signal.

SUMMARY OF THE INVENTION

A data signal processor responsive to a pair of output signals in phase quadrature from the sensor compares a two-bit binary number representation of the quadrature signals at successive occurring samples times or instances. The data signal processer provides an output signal having an output pulse for each change in the binary number value which corresponds to each passing of one quarter of a fringe change which corresponds to a $\pi/2$ phase change between the counter-propagating waves.

BRIEF DESCRIPTION OF THE DRAWINGS

FIG. 2 shows a timing diagram for FIG. 1.

FIG. 3 shows a portion of the circuit of FIG. 1 and corresponding Truth Table.

FIG. 4 shows a system Truth Table of FIG. 1.

DESCRIPTION OF THE PREFERRED EMBODIMENT

Figure 1:
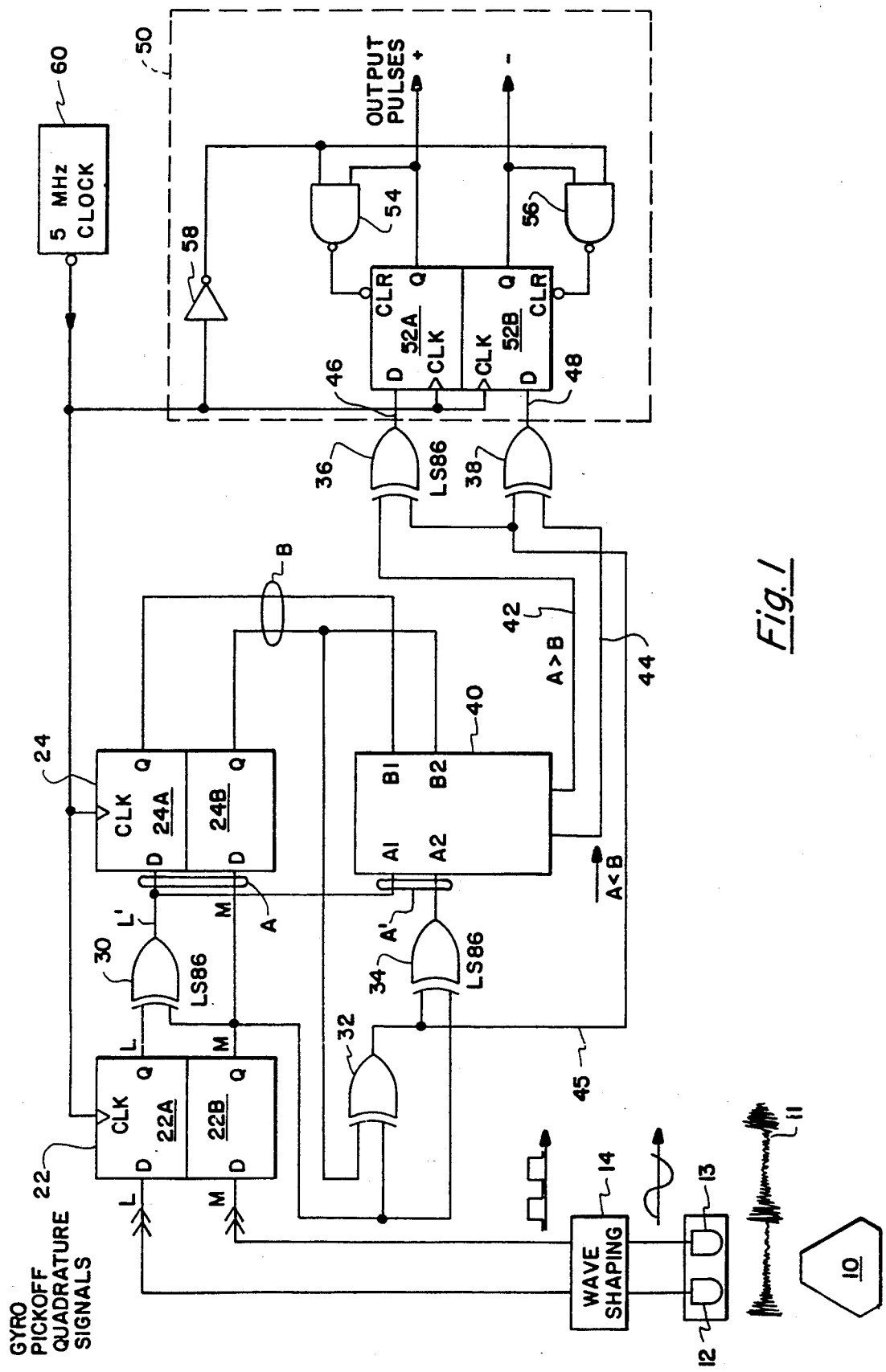
FIG. 1 is a schematic diagram of one embodiment of the invention.

One embodiment of the present invention is illustrated by way of example in FIGS. 1-5. With specific reference to FIG. 1, there shown is a readout apparatus for a ring laser angular rate sensor 10 having counter-propagating laser beams therein such as a sensor substantially shown and described in U.S. Pat. No. 3,373,650 which is incorporated herein by reference thereto. A portion of each of the counter-propagating laser beams is extracted from the sensor and combined to form an intereference fringe pattern 11. A detector array comprising at least two photodetectors 12 and 13 provides a pair of output signals substantially in phase quadrature. By way of example, a pair of photodectors are separated spacially by one quarter of a fringe spacing so as to be responsive to the interference pattern and thereby produce a pair of output signals in phase quadrature. The signals in turn are passed through a wave shaping circuit 14 so as to produce a pair of quadarature signals as illustrated in FIGS. 1 and 2 and identified as signals L and M. By way of example, a detector array is illustrated in U.S. Pat. No. 4,152,072 which is incorporated herein by reference thereto.

Signals L and M are generally used in the art of ring laser angular rate sensors for determining (i) angular rotation and rotation rate, (ii) and rotation direction in a well known manner. Typically, each cycle of either of signals L or M provides an indication of a $2\pi$ phase change between the counter-propagating laser beams. Each $2\pi$ phase change corresponds to a precise angular rotation as is well known. In the present invention, an output signal change is provided for each positive and negative $\pi/2$ phase change between the counter-propagating laser beams.

Referring again to FIG. 1, signals L and M are presented to a data signal processing means including a pair of two-bit storage devices or registers illustrated by way of example as two bit binary registers 22 and 24 comprised of D-type flip-flops, Exclusive-OR gates, and a binary signal comparator 40. Signals L and M are presented to the D-inputs of flip-flop 22A and B, respectively. The Q-output of flip-flop 22B is presented to the D-input of flip-flop 24B. Each Q output of flip-flops 22A and B are presented to exclusive-OR gate 30 having its output presented to the D-input of flip-flop 24A, and the least significant bit A1 of comparator 40. The Q-output of flip-flop 24A and the Q-output of flip-flop 24B is presented to the least and least +1 significant bit inputs, B1 and B2 respectively, of comparator 40.

The Q-outputs of flip-flop 22B and 24B are presented as inputs to exclusive-OR gate 32 having its output presented to one input of exclusive-OR gates 34, 36, and 38 on signal line 45. The second input of exclusive-OR gate 34 is connected to the Q-output of flip-flop 22B. The output of exclusive-OR gate 34 is presented to the least +1 input, A2, of comparator 40.

Binary comparator 40 provides a high level output signal on signal line 42 only when the binary number A is greater than the binary number B, and presents a high level output signal on signal line 44 only when A is less than B. Whenever A and B are equal, a low level state exists on signal lines 42 and 44. Signal lines 42 is presented as one input of Exclusive-OR gate 36, and signal line 44 is presented as one input of Exclusive-OR gate 38.

The outputs of exclusive-OR gates 36 and 38 are presented to a pulse shaping circuit 50 including D-Type flip-flops 52A and 52B, NAND gates 54 and 56, and inverter 58. The output of exclusive-OR gate 36 is presented to the D input of flip-flop 52A having its Q-output presented as one input to NAND gate 54, and the output of exclusive-OR gate 38 is presented to the D-input of flip-flop 52B having its output connected to NAND gate 56. The output of NAND gate 54 is presented to the clear input of flip-flop 52A, and the output of NAND gate 56 is presented to the clear input of flip-flop 52B.

A five MHz clock signal 60 is presented to each of the D-type flip-flops. Clock signals are also presented to NAND gates 54 and 56 through inverter 58.

In FIG. 1, exclusive-OR gate 30 in combination with the Q outputs of flip-flops 22A and B provide a monotonic increasing or decreasing binary representation of the quadrature signals L and M. FIG. 3 diagrammatically shows exclusive-OR gate 30 having inputs L and M thereby providing output L'. Also shown in FIG. 3 is the Truth Tables showing the quadrature signals M and L, and the binary signals M and L'. It can be seen from the Truth Table that if the quadrature signals L and M are such that L continuously leads M, the two-bit binary representation M-L', where M is the most significant bit, is a binary signal pair which is monotonically increasing to the maximum bits and then recirculates back to a 0—0 condition. Flip-flops 24A and B store the binary representation M-L' of the quadrature signals M and L.

It should be noted that the timing diagram shown in FIG. 2, for exemplary purposes, may be considered one for a clockwise direction of sensor 10. However, in the counterclockwise direction, the timing diagram reverses such that M will lead L. In the circumstances, M-L' monotonically decreases in value.

Comparator 40 functions as a two bit binary comparator for comparing the binary number B with A. The binary number B being the output of dual flip-flop register 24 as aforesaid. Binary number A is a massaged binary representation of M and L' prior to the next clock cycle. The least significant bit, L' is directly connected to A1, the least significant bit of binary number A. The most significant bit A2 of binary number A is the Q-output of flip-flop 22B, identified as signal M, but which is passed through exclusive-OR gate 34 conditioned upon the exclusive-OR operation of the most significant bit outputs of flip-flop 22B and 24B.

As will be now described, the output of exclusive-OR gate 36 identified as signal line 46 provides an output pulse for each $\pi/2$ phase change of the counter-propagating waves when the sensor is rotating in the clockwise direction (CW). Similarly, exclusive-OR gate 38 having output signal line 48 provides an output pulse for each $\pi/2$ phase change when the sensor is rotating in the counterclockwise direction (CCW). Binary registers 22 and 24 are clocked in such a manner so that register 24 has old data and register 22 has new data. Comparator 40 operates in a manner to compare the binary representation of the old and new quadrature signals, L and M, so as to provide appropriate signals on signal lines 46 and 48.

Since the two-bit binary number representations stored in registers 22 and 24 circulate or wrap around such as illustrated in the Truth Table of FIG. 3, an ambiguity exists about the 0—0 to 1—1 state changes. Therefore, the binary representation of new data must be massaged prior to comparison by comparator 40 and the output of comparator 40 must also be massaged to obtain the intended output pulses on the proper signal lines 46 or 48.

Proper massaging is accomplished by a most significant bit comparator provided by exclusive-OR gate 32 which compares the new and the old most significant bits, namely the outputs of flip-flops 22B and 24B. The output of exclusive-OR gate 32 functions in the following manner. If the most significant bits are the same, the Q-output of flip-flop 22B passes through exclusive-OR gate 34 and is presented to A2 of comparator 40. If, however, the most significant bits are different, the Q-output presented to A2 is reversed. Similarly, the output on comparator signal lines 42 and 44 are passed to output signal lines 46 and 48 if the most significant bits of the old and new data are the same. However, the output state on output signal lines 46 and 48 is the reverse of that on signal lines 42 and 44 if the most significant bits of the outputs of 22B and 24B are different.

FIG. 4 shows a Truth Table which shows the signal states during the transient condition between a new and old binary signal change (M-L'). It should be noted that binary number B is the old binary data represented by the output of register 24. The new binary data A is represented as the input to register 24. Binary number A' is the massaged value of the new binary data and is flagged by asterisks where it differs from A. As can be seen by the Truth Table shown in FIG. 4, in the clockwise direction, for each state change in the new binary number, the CW signal line 46 is a high state and the CCW signal line 48 is a zero. Similarly, in a CCW direction, for each binary number state change, the CCW signal line 48 is a high state, and the CW signal line 46 is a low state.

It should be emphasized that signal lines 46 and 48 are only at a high state during a transient condition between the new and the old binary data represented by the inputs and the outputs of register 24, and separated in time by only a single clock signal. When the next clock signal occurs, there will be no difference between the old and the new binary data, and therefore signal lines 42 and 44 from comparator 40 will both be low level states. During these situations, the most significant bit comparator provided by exclusive-OR gate 32 has a zero output since both inputs are identical. Therefore, binary numbers A and B are identical thereby providing a low state output on signal lines 42 and 44 and subsequently on the CW-line 46 and the CCW-line 48.

Also shown in FIG. 1 is the pulse shaping circuit 50 as previously described. In operation, flip-flops 52A and 52B latch the output of exclusive-OR gates 36 and 38, respectively. During the first half of the clock cycle the D-input is transferred to the Q-output of flip-flops 52A and 52B. During the latter half of the clock signal, which ever of the flip-flops has a high output state, the clear input will be such to reset the flip-flop. Doing so provides a defined output pulse having a width of one half of the clock cycle. Of course, there are many approaches for providing an output pulse of predetermined width.

It should be recognized that the data signal processing means illustrated in FIG. 1 maybe applicable to any pair of quadrature signals for obtaining 4 times the resolution of any one of the input signals. Further, it should be recognized that the circuit of FIG. 1 may be implemented by a wide variety of digital techniques including microprocessors, computers, and the like for performing the intended functions.

Figure 5:
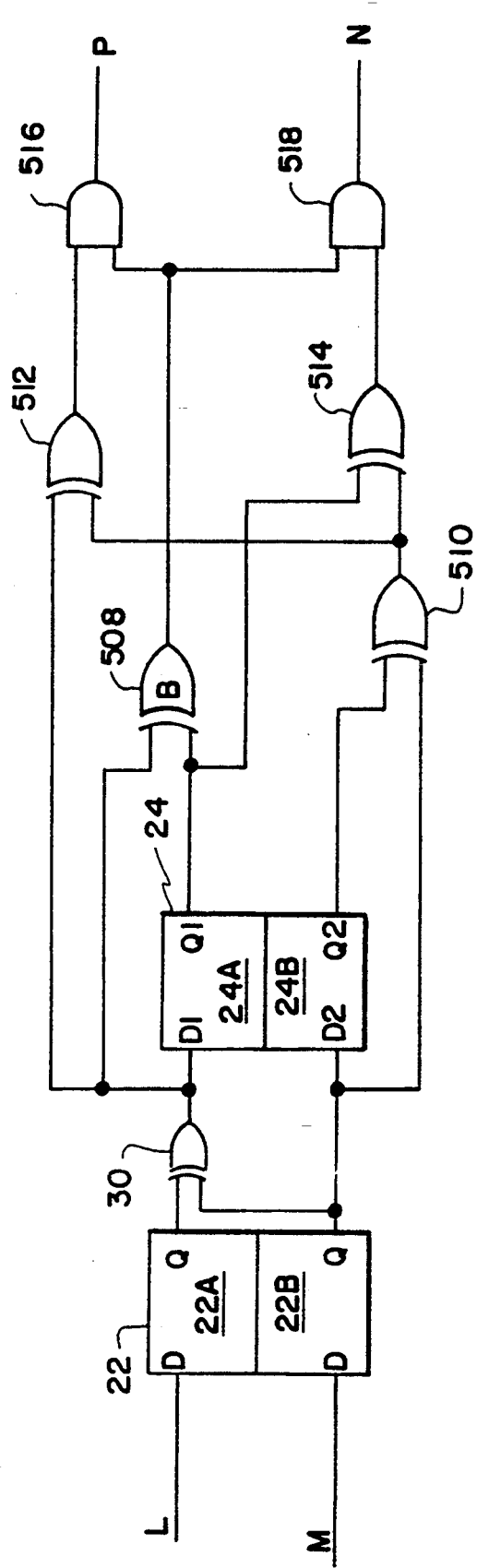
FIG. 5 is a schematic diagram of another embodiment of the invention.

Shown in FIG. 5 is an alternate embodiment of the invention similar to that shown in FIG. 1. In FIG. 5, binary registers 22 and 24 and exclusive-OR gate 30 serve the same intended function as that shown in FIG. 1 and the same numeral designation has been retained.

In FIG. 5, exclusive-OR gate 508 compares the D-input and the Q-output of flip-flop 24A, and exclusive-OR gate 510 compares the D-input and the Q-output of flip-flop 24B. Exclusive-OR gate 512 compares the D-input of flip-flop 24A and the output of exclusive-OR gate 510. Exclusive-OR gate 514 compares the output of exclusive-OR gate 510 and the output of flip-flop 24A. AND circuit 516 operates on the output of exclusive-OR gates 508 and 512, and AND gate 518 operates on the outputs of exclusive-OR gates 508 and 514. The output of AND gates 516 and 518 are identified as signals P and N, respectively, representing the CW rotation output signals and the CCW rotation output signals, respectively.

In operation, the circuit of FIG. 5 provides output signals P and N identical to signal lines 46 and 48 as identified by the Truth Table of FIG. 4. Namely in a CW direction, signal pulses are produced on signal line P, and in the CCW direction pulses are presented on the N signal line. Each pulse, as before, represents $\pi/2$ phase change between the counter-propagating waves—one quarter of a fringe spacing change.

It should also be noted that in FIGS. 1 and 5, a single exclusive-OR gate 30 was utilized for the intended function of converting the quadrature signal to a monotonic increasing or decreasing binary signal. The conversion circuit may also have been provided by several alternate techniques. For example, the output of register 22 may have directly provided as inputs to register 24. In these circumstances, the least significant bit of binary number B (old) would be the exclusive-OR function of the Q-outputs of flip-flops 22A and 22B; and the least significant bit of binary number A (new) would be the exclusive-OR function of the Q-outputs of flip-flops 24A and B. Doing so will provide essentially the same Truth Table as illustrated in FIG. 4. Lastly, the binary to conversion circuit may be provided prior to the input 22A and 22B and the outputs of register 22 are directly connected to the inputs of register 24. However, in these circumstances there may be some ambiguity and a loss of synchronous control may result.

The clock signal generator 60 has been illustrated as a 5 MHz clock. However, the clock signal need only be greater than the maximum quadrature signal state rate of change to insure that a two count difference between the new and old binary signals never occurs—except possibly at power on.

While only certain particular embodiments have been described in detail herein, it will be apparent to those familiar with the art that certain modifications can be made without departing from the scope of the invention as defined by the following claims.

The embodiments of the invention in which an exclusive property or right is claimed are defined as follows:

1. A readout apparatus for a laser angular rate sensor having counter-propagating laser beams which exhibit a changing phase difference between said beams in the presence of rotation, said readout apparatus comprising:
   first means responsive to at least one of said laser beams for producing a first signal which has first and second signal levels as a function of said phase difference between said beams, and wherein said signal level cyclically changes level for each $\pi$ phase change between said beams;
   second means responsive to at least one of said laser beams for producing a second signal which has first and second signal levels as a function of said phase difference between said beams, and wherein said signal level cyclically changes level for each $\pi$ phase change between said beams, and wherein said second signal is in phase quadrature with said first signal in the presence of rotation;
   third means responsive to said first and second signals for providing a two-bit binary number representation of said levels of said first and second signals, said two-bit binary number representation restricted to monotonically increasing in the presence of rotation in one direction and decreasing in the presence of rotation in the opposite direction; and
   signal processing means responsive to said two-bit binary number representation for providing at least one output signal having a selected signal change for each change in value of said two-bit binary number such that each output signal change represents a $\pi/2$ phase change between said counter-propagating laser beams.

2. The apparatus of claim 1 wherein said signal processing means includes:
   first and second storage means for storing said states of said first and second signals, respectively, at a first instant;
   a first exclusive-OR gate for comparing outputs of said first and second storage means;
   a third storage means for storing said first exclusive-OR output at a second instant occurring prior to said first instant;
   a fourth storage means for storing the output of said second storage means at said second instant; and
   comparator means for comparing the binary number value represented by said exclusive-OR output and said second storage means with the binary number value represented by said third and fourth storage means, said comparator having an output indicative of said comparison.

3. The apparatus of claim 2 wherein said comparator means includes:
   second exclusive-OR means for comparing outputs of said first exclusive-OR gate and said third storage means;
   third exclusive-OR means for comparing outputs of said second and fourth storage means;
   fourth exclusive-OR means for comparing outputs of said first and third exclusive-OR means;
   fifth exclusive-OR means for comparing outputs of said third storage means and said third exclusive-OR means;
   first AND gate for comparing the outputs of said second and fourth exclusive-OR means and providing an output signal change for each $\pi/2$ phase change caused by said sensor rotating in a first sensor direction; and
   second AND gate for comparing the outputs of said second and fifth exclusive-OR means and providing an output signal change for each $\pi/2$ phase change caused by said sensor rotation in a second direction.

4. The apparatus of claim 1 wherein said signal processing means includes a first output signal line having a selected signal change for each $\pi/2$ phase change between said laser beams in the presence of rotation in a first direction, and a second output signal line having a selected signal change for each $\pi/2$ phase change between said laser beams in the presence of rotation in the opposite direction.

5. The apparatus of claim 1 wherein said signal processing means includes:
   a first two-bit storage register for storing binary data representing said signal levels of said first and second signals at a first instant;
   a second two-bit storage register for storing said two-bit binary number representing said signals levels of said first and second signals prior to said first instant; and
   comparator means for comparing a first two-bit binary number derived from said binary number stored in said first register and a second binary number derived from said binary number stored in said second register, said comparator providing at least one output signal representative of the comparison of said first and second binary numbers.

6. The apparatus of claim 1 further comprising:
   an exclusive OR gate having as inputs first and second bit outputs of said first two-bit storage register; and
   said second two-bit storage register having
      a first bit input coupled to the output of said exclusive OR gate, and
      having a second bit input coupled to the output of said second bit output of said first register.

7. The apparatus of claim 6 wherein said output of said exclusive OR gate and said second output of said first register forms said derived first two-bit binary number.

8. A readout apparatus for a laser angular rate sensor having counter-propagating laser beams which exhibit a changing phase difference between said beams in the presence of rotation, said readout apparatus comprising:
   means for optically combining a portion of each of said beams to form an interference fringe pattern;
   first detector means responsive to said interference fringe pattern for generating a first signal having first and second signal levels as a function of said phase difference between said beams, and wherein said signal cyclically changes level for each $\pi$ phase change between said beams;
   second detector means responsive to said interference fringe pattern for generating a second signal having first and second signal levels as a function of said phase difference between said beams, and wherein said signal level cyclically changes level for each $\pi$ phase change between said beams, and wherein said second signal is in phase quadrature with said first signal in the presence of rotation;
   first means responsive to said first and second signals for providing a two-bit binary number representation of said first and second signals, said two-bit binary number representation restricted to monotonically increasing in the presence of rotation in one direction and decreasing in the presence of rotation in the opposite direction; and
   signal processing means responsive to said two-bit binary number representation for providing at least one output signal having a selected signal change for each change in the value of said two-bit binary number such that each output signal change represents a $\pi/2$ phase change between said counter-propagating laser beams.

* * * * *